UNITED STATES PATENT OFFICE.

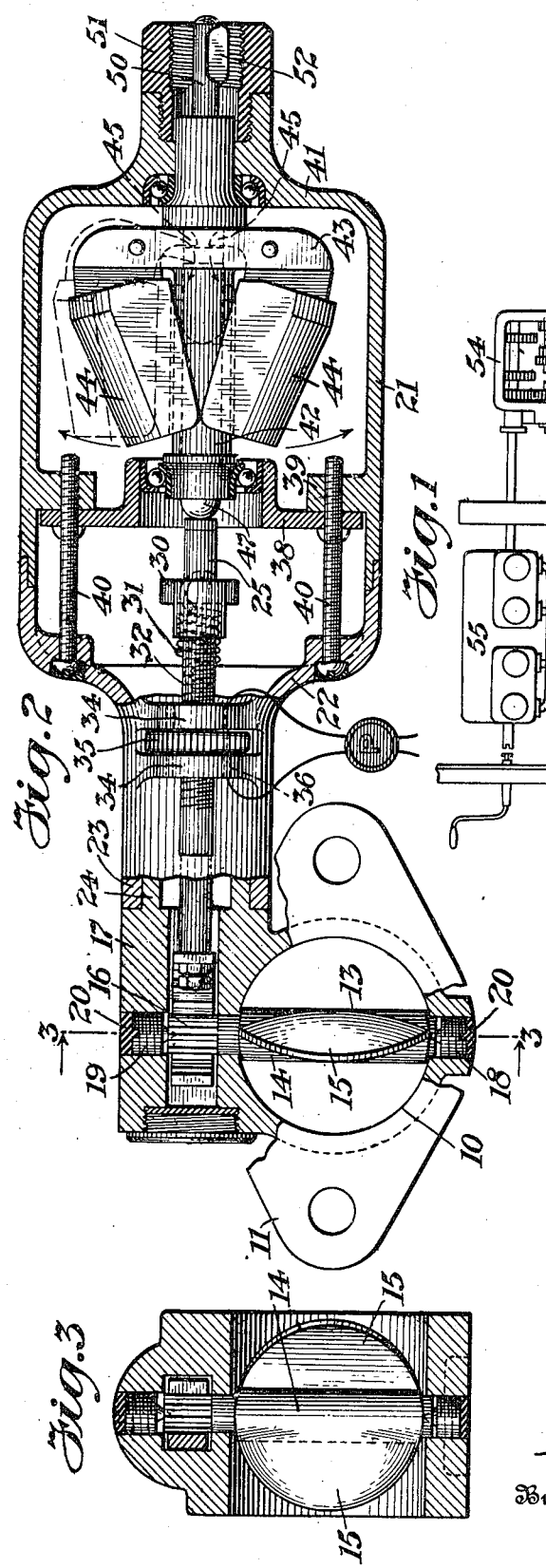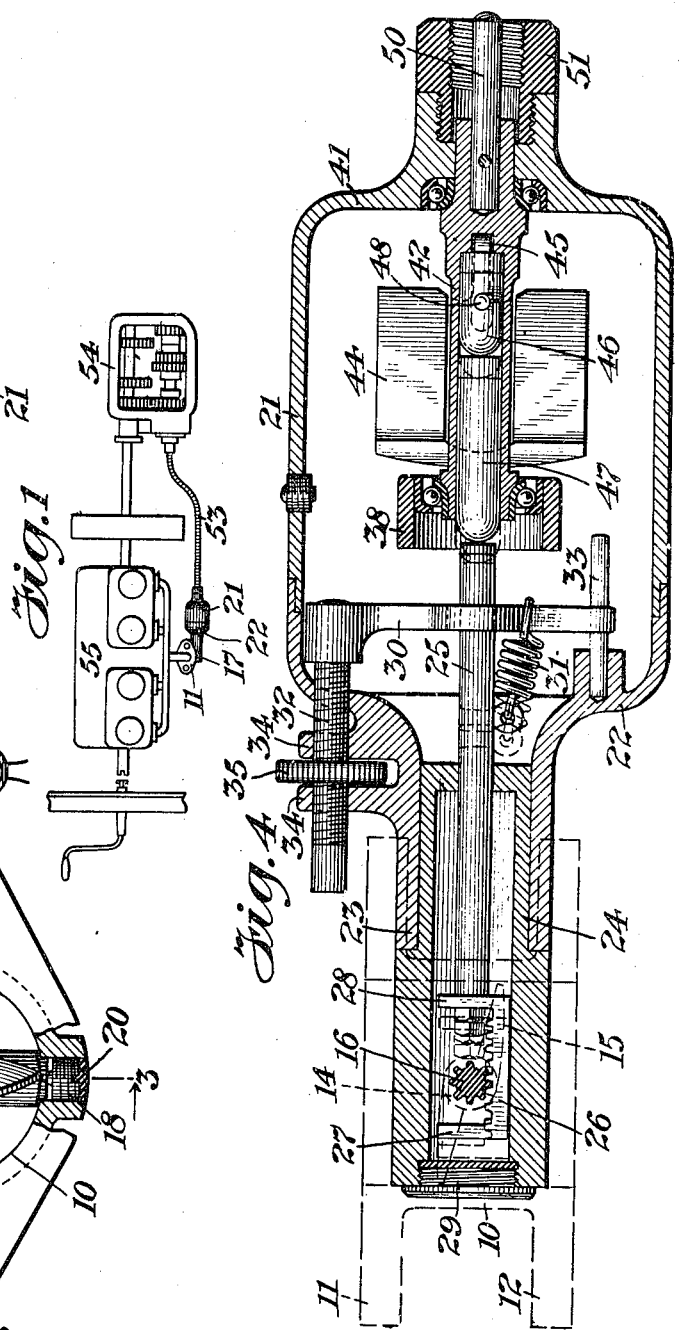

GEORGE W. PIERCE, OF ANDERSON, INDIANA, ASSIGNOR TO THE PIERCE GOVERNOR CO., OF ANDERSON, INDIANA, A CORPORATION OF INDIANA.

SPEED-GOVERNOR.

1,295,199.  Specification of Letters Patent.  Patented Feb. 25, 1919.

Application filed September 26, 1916. Serial No. 122,197.

*To all whom it may concern:*

Be it known that I, GEORGE W. PIERCE, a citizen of the United States, and resident of Anderson, in the county of Madison and State of Indiana, have invented certain new and useful Improvements in Speed-Governors, of which the following is a specification.

My present invention includes various features of improvement in the construction and functioning of centrifugal governors and while certain of them are adapted for use in various relations, I have selected for illustration herein a governor particularly adapted for limiting the road speed of explosive motor vehicles such as automobiles, trucks and tractors. The device as shown is thus primarily designed as an improvement in the devices of the type shown in my prior Patent No. 1,140,060, granted May 18th, 1915, and of the device shown in patent to Hutchison, No. 1,142,099, granted June 8th, 1915. It will be understood that various features of my invention may be usefully employed in connection with centrifugal governors for limiting the motor speed independently of the road speed or for maintaining constant speed under variable loads.

In the specific device herein shown, my object has been to produce a simple, durable structure adapted for ready and convenient application to existing types of explosive motor outfits without the necessity of any re-designing of the latter; which is adapted to stand up under the very rough usage to which such devices are subject; which is delicately responsive and reliable in performing the speed governing function; which is readily adjustable for functioning at desired speeds; and which is adapted to be sealed against readjustment or other tampering by the operator.

An important feature of my invention is to get within the required small compass centrifugal weights of sufficient mass and operating through connections of sufficient mechanical efficiency to make the work which they do in throttling the motor negligible as compared with the centrifugal power that they develop at the critical speed since a proper correlation of these factors results in eliminating a practical defect commonly found in such devices; namely, the tendency to over-throttling and under-throttling which has the disagreeable effect of first slowing the motor too much, then permitting it to overspeed too much, thus causing cyclic variations of speed which in practice may be objectionably pronounced. For these and other reasons, I employ a butterfly throttle valve which has the two wings offset and normally diagonal to the shaft when in closed position so that the valve itself will be more nearly balanced and in case of complete closure, will open by a movement directly away from the wall of the passage instead of having the initial movement parallel with the wall as in the case of a diametric butterfly valve. The governor proper is of special construction, the centrifugal weights being pivoted at points remote from the axis so located that at all speed less than the critical speed at which their speed limiting function comes into play, the inertial center or center of mass of the weights is as near or nearer the axis of rotation as are their pivotal points. Thus substantially all of the movement of the weights is in a radial direction and with little or no axial component. The extent of the movement is thus directly proportional to the amount of rotative movement of the throttle. Furthermore, their entire range of action is limited to a small arc where their movement is approximately radial to the axis. In order to get the maximum weight within a case of minimum diameter, the weights are approximately cylindrical on their outer surface, the diameter of their cylindrical curvature being such that when in the extreme extended position of operation, they fit the cylindrical case, preserving, however, an amply safe clearance. The centrifugal power of the weights is applied lengthwise of the shaft through integral bell-crank extensions inward from the pivotal points. The radial play of the weights being through a relatively small arc and hence approximately rectilinear, the action of the bell-crank or the longitudinally movable shaft are also through correspondingly small arcs and are substantially rectilinear. This construction preserves the advantages of pivoted centrifugal members while practically combining therewith the simplicity of radial straight-line-flying centrifugal members, There are many minor features of my invention such as having the entire mechanism extending horizontally at right angles from the motor manifold, thus taking it out of the way of the carbureter located immediately below the same; making the manifold connection rotatable about the axis of the governor shaft so that the governor may extend either forward or backward regardless of whether the manifold happens to be on the right or left side of the motor, and thus, too, without disorganizing the relation of the throttle pinion to the rack through which the governor operates it; the connection of the drive directly to the driven shaft within the change speed gear case to minimize the possibility of undetected tampering by the operator, etc. These and others will be more readily understood from the detailed description thereof in connection with the accompanying drawing, in which—

Figure 1 is a top plan view showing rather diagrammatically an engine and transmission gearing having my improved device attached thereto;

Fig. 2 is a horizontal, central, longitudinal section of one embodiment of my invention;

Fig. 3 is a transverse section on the line 3—3 of Fig. 2; and

Fig. 4 is a central longitudinal section in a plane at right angles to the plane of Fig. 2.

My improved device in the form illustrated includes a conduit section 10 having flanges 11 and 12 at opposite ends thereof and adapted to be inserted as a section of the inlet conduit of the engine. This conduit section is preferably installed between the carbureter and the manifold, but with some construction of carbureters it might be installed below the carbureter. Within the conduit section 10 is a throttle valve 13 of the butterfly type and mounted to rotate about an axis extending diametrically of the conduit. The throttle includes a body portion 14 and wings 15, 15, extending substantially tangentially in opposite directions and from opposite sides of the body portion or axle 14. The wing portions 15, 15, are of such shape that they may engage with the walls of the conduit to substantially close the latter, but by constructing them in spaced parallel planes, the initial movement of the wings from the closed position is more directly away from the wall of the conduit than would be the case were the wings in the same plane including the axis of rotation. The movement from closed to maximum opened position requires a rotation of the axis through considerably less than 90°. Furthermore, the wings are prevented from swinging past closed position by engagement with the walls and thus constitute a stop to limit the movement of the governor weights as will appear more clearly hereinafter.

The body portion of the throttle at one end has a pinion 16 integral therewith and disposed within and diametrically across a tubular sleeve 17 preferably cast integral with the conduit section 10. The throttle and pinion may be supported and properly adjusted by threaded bearing blocks 18 and 19 terminating in conical bearing points in alinement with each other and engaging with the opposite ends of the throttle and pinion. These bearing blocks may be of somewhat shorter length than the thickness of the wall so that their outer ends terminate below the outer surface of the casting and after they are once properly adjusted, they may be sealed by filling the remaining space with solder as shown at 20.

The tubular sleeve 17 on the side of the conduit section 10 serves to support the main body of the governor which operates the throttle 13. The casing of the governor is shown as being formed of two sections 21 and 22, the latter terminating in a sleeve portion 23 encircling a reduced portion 24 of the part 17. A longitudinally movable rod 25 extends through and is supported by this reduced portion 24 and within the part 17 is connected to a rack bar 26 meshing with the pinion 16. The rack bar is shown as having flanges 27 and 28 at opposite ends thereof and to one of these flanges 28 the rod 25 is rigidly secured in any suitable manner. The flange 27 may be omitted although in practice it may be so positioned that it will engage with the side of the pinion and limit the movement of the rack bar in one direction and thus prevent movement of the throttle past the neutral or wide-open position. The chamber containing the pinion and rack bar may be closed at its outer end by a suitable cap 29 and may be sealed so that no one can tamper with it.

The throttle valve is normally held in wide-open position and the governor hereinafter described does not operate to close the throttle until a predetermined speed has been reached. In order to hold the valve in open position and prevent it from being moved until a predetermined force is exerted by the centrifugal governor, I provide a spring and provide improved means for regulating the tension of the spring, so that the speed, which must necessarily be secured before the closing operation begins, may be varied at will.

In the specific construction illustrated, an arm 30 extends diametrically across the governor casing and a spring 31 connects this arm to the rod 25. The arm is mounted on a threaded support 32 and is held against rotation by engagement with a guide 33. The threaded support 32 extends through the casing and through a pair of spaced lugs 34 on the outer side of the case section 22. Between the two lugs is a milled nut 35 threaded on the part 32 and held against longitudinal movement by the lugs 34. By rotating the nut 35, the arm 30 and its support 32 may be moved lengthwise of the casing and the tension of the spring 31 may be increased or decreased at will. In order to prevent any one from tampering with this regulating device, any suitable form of seal may be provided. As shown the pair of lugs 34 and the nut 35 may have registering apertures 36 through which a wire may be extended. The ends of the wire may be brought together and sealed with an ordinary lead seal or in any other suitable manner.

Within the casing section 22 there is mounted my improved centrifugal governor with its axis in direct line with the rod 25. As shown, the casing section 21 has a transversely extending partition or spider 38 rigidly secured in place in any suitable manner as, for instance, by screws connecting it to inwardly extending lugs 39. These same lugs may serve to receive screws 40 for connecting together the two sections 21 and 22 of the governor casing. The spider 38 and the rear end wall 41 of the casing section 21 serve to support a rotatable hollow shaft 42 in suitable ball bearings so that the shaft may be rotated with the minimum friction. Adjacent to the end wall 41, the shaft is provided with outwardly extending arms 43 to which are pivotally secured two weights 44, 44. Each of these extend in the general direction of the length of the casing and each have lugs or finger portions 45 extending inward radially from the pivotal supports of the weights and into the longitudinal bore through the hollow shaft 42. Within the shaft are two pins 46 and 47 in alinement with each other. The pin 46 is held against rotation in respect to the hollow shaft by a pin 48 extending through slots disposed lengthwise of the hollow shaft while the pin 47 is free to rotate. One end of each pin is rounded or of substantially hemispherical shape so that the engaging surface at the end is reduced to a minimum and the friction is likewise reduced. The pin 47 at all times engages at one end with the pin 46 and at the other with the rod 25 and is free to rotate in respect to both. The pin 46 is caused to rotate with the hollow shaft 42 while the rod 25 is held against rotation. The pin 47 may either rotate with the hollow shaft or may merely move endwise without rotating, dependent upon the point at which there is the minimum friction.

The hollow shaft 42 may be connected in any suitable manner to any device, the speed of which is to be employed for regulating the throttle 13. As shown, the hollow shaft has a pin 50 rigidly secured thereto and disposed within a collar 51 on the casing and provided with a key portion 52. To this pin or shaft extension there may be secured a flexible drive shaft or any other suitable driving connection. In Fig. 1 I have shown a flexible drive shaft 53 extending from the governor to the intermediate shaft of the transmission 54 which latter is driven from the engine 55. With the engine used as an automobile and the device connected as shown in Fig. 1, the governor will operate to throttle the engine when the automobile speed exceeds a predetermined limit, irrespective of whether the engine be geared to the driving wheels of the automobile through the high, intermediate, low, or reverse gears.

Instead of connecting the governor shaft to a driven part of the vehicle, it may be geared to the fly-wheel or any other part of the engine itself so that the engine speed will be limited without regard to the speed of the vehicle.

In operation, it will be noted that the rotation of the shaft 42 causes the rotation of the governor weights 44 and that spring 31 tends to prevent any endwise movement of the pin 46 and any corresponding outward movement of the governor weights. When the speed of the shaft 42 becomes such that the action of centrifugal force on the weights 44 exceeds the effective resistance of the spring 31, the weights will move outwardly and the parts 46, 47, 25, and 26 will move endwise toward the left from the position shown in Figs. 2 and 4, and the throttle will move toward a closed position. The tension of the spring 31 can be so regulated that the weights will not move under the influence of centrifugal force until any predetermined speed has been reached. After the device has been tested and the correct tension of the spring secured, the nut 35 may be sealed and the driver of the car cannot thereafter exceed the predetermined limit without breaking the seal and changing the adjustment of the spring 31. The fact that the car returns with the seal unbroken is conclusive evidence that the car has not been driven in excess of the limit for which the device is set. It is of course understood that the throttle 13 is independent of and separate from the ordinary throttle with which the driver may control the speed of the engine at all speeds below that for which the governor is set.

The device may be installed in any desired position, dependent upon the construction and position of the engine intake conduit and the position and construction of the carbureter. It will be noted that the governor casing may be rotated in respect to the conduit section 10 by turning the part 23 on the part 24. Thus, the body portion of the governor may be connected at the side of the conduit toward the engine, or the side away from the engine, or may extend toward either end of the engine.

Having thus described my invention, what I claim as new and desire to secure by Letters Patent is:

1. A speed limiting device, including a conduit section having a tubular extension upon one side thereof, a throttle valve within said conduit, a pinion within said extension and rigid with said throttle valve, a casing having its axis disposed in a substantially horizontal plane and connected to and supported by said extension, a rack bar meshing with said pinion, a rod in line with said rack bar and projecting into said casing, and centrifugally actuated means within said casing for moving said rod.

2. A speed limiting device, including a conduit section having a tubular extension upon one side thereof, a throttle valve within said conduit, a pinion within said extension and rigid with said throttle valve, a casing having its axis disposed in a substantially horizontal plane and connected to and supported by said extension, a rack bar meshing with said pinion, a rod in line with said rack bar and projecting into said casing, centrifugally actuated means within said casing for moving said rod in one direction, a spring for moving said rod in the opposite direction, and means for varying the normal tension of said spring.

3. A speed limiting device, including a conduit section having an extension at one side thereof and formed integral therewith, a cylindrical casing secured to said extension and having its axis in line with the axis of the latter, a throttle valve within said conduit section, a pinion within said extension and connected to said throttle valve, a rack bar meshing with said pinion and extending into said casing, and a centrifugally actuated device within said casing and in line with said rack bar for operating the latter.

4. A speed limiting device including a two-part casing, bearings supported within and adjacent to opposite ends of one part of said casing, a hollow shaft supported in said bearings, a pin movable lengthwise of said hollow shaft, centrifugally actuated devices pivoted to said hollow shaft for moving said pin endwise within said shaft, and a non-rotatable valve actuating rod carried by the other part of said casing and in alinement with and actuated by said pin.

5. A speed limiting device including a two-part casing, bearings supported within and adjacent to opposite ends of one part of said casing, a hollow shaft supported in said bearings, a pin movable lengthwise of said hollow shaft, centrifugally actuated devices pivoted to said hollow shaft for moving said pin endwise within said shaft, a rack bar in axial alinement with said pin and operated by the latter and supported by the other part of said casing, and a throttle valve having a pinion meshing with said rack bar.

6. A speed limiting device, including a two-part cylindrical casing, a valve actuating rod supported in one part of said casing, a centrifugally actuated device supported in the other part of said casing and having operative engagement with said rod, an arm adjacent to said rod and within said first mentioned casing part, a spring connecting said arm and said rod, and means for adjusting said arm lengthwise of said rod to vary the tension of said spring.

7. A speed limiting device, including a two-part cylindrical casing, a valve actuating rod supported in one part of said casing, a centrifugally actuated device supported in the other part of said casing and having operative engagement with said rod, an arm adjacent to said rod and within said first mentioned casing part, a spring connecting said arm and said rod, and means for adjusting said arm lengthwise of said rod to vary the tension of said spring, said means including a threaded supporting member extending substantially parallel to said rod and to the exterior of said casing, and a nut in engagement with said member and held against longitudinal movement for moving said member endwise upon a rotation of said nut.

8. A speed limiting device, including a casing, a centrifugally actuated device therein, a rod movable lengthwise of said casing under the influence of said centrifugally actuated device, an arm extending transversely of said casing, a threaded supporting member for one end of said arm, a guide for the opposite end of said arm, a spring connecting said arm and said rod, and means outside of said casing for moving said threaded support endwise to vary the tension of said spring.

9. A speed limiting device including a throttle, longitudinally movable operating means for said throttle, a spring normally holding the throttle open and a speed limiting centrifugal governor for closing said throttle against the pressure of said spring at a predetermined speed, said governor comprising a cylindrical case, an axially arranged shaft therein, radially extending members rotatable with said shaft, centrifugal weights pivotally supported by said members at points equi-distant from the axis of rotation thereof, said pivotal members comprising arms extending radially inward from said pivotal points, and weights extending along the axis of rotation and having their center of mass located approximately the same distance from the axis of rotation as their respective pivots, and means for limiting the outward radial movement of said weights to a relatively small arc.

10. A speed limiting device including a throttle, longitudinally movable operating means for said throttle, a spring normally holding the throttle open and a speed limiting centrifugal governor for closing said throttle against the pressure of said spring at a predetermined speed, said governor comprising a cylindrical case, an axially arranged shaft therein, radially extending members rotatable with said shaft, centrifugal weights pivotally supported by said members at points equi-distant from the axis of rotation thereof, said pivotal members comprising arms extending radially inward from said pivotal points, and weights extending along the axis of rotation and having their center of mass located approximately the same distance from the axis of rotation as their respective pivots, and means for limiting the outward radial movement of said weights to a relatively small arc, said weights being formed so that when in the extended position, they substantially conform to the cylindrical interior of said case and when in the innermost position, they substantially conform to said shaft.

Signed at Anderson, in the county of Madison and State of Indiana, this 5th day of September, A. D. 1916.

GEORGE W. PIERCE.

Witnesses:
I. E. MUSTON,
N. M. McCULLOUGH.